United States Patent [19]
Bastioli et al.

[11] Patent Number: 5,736,586
[45] Date of Patent: Apr. 7, 1998

[54] BIODEGRADABLE FOAMED PLASTIC MATERIALS

[75] Inventors: Catia Bastioli, Novara; Vittorio Bellotti, d'Agogna; Gianfranco Del Tredici, Sesto Calende; Alessandro Montino, Robbio Lomelliana; Roberto Ponti, Oleggio, all of Italy

[73] Assignee: Novamont S.p.A., Novara, Italy

[21] Appl. No.: 512,673

[22] Filed: Aug. 8, 1995

[30] Foreign Application Priority Data

Aug. 8, 1994 [IT] Italy ................... MI94A1725

[51] Int. Cl.$^6$ ................... C08J 9/12
[52] U.S. Cl. ................... 521/84.1; 521/109.1; 521/130; 521/138; 521/139; 521/141
[58] Field of Search ................... 521/84.1, 109.1, 521/130, 138, 139, 141

[56] References Cited

U.S. PATENT DOCUMENTS

| | | |
|---|---|---|
| 5,185,382 | 2/1993 | Neumann et al. |
| 5,208,267 | 5/1993 | Neuman et al. |
| 5,413,855 | 5/1995 | Kolaska et al. |
| 5,506,277 | 4/1996 | Griesbach, III ............... 521/84.1 |
| 5,523,331 | 6/1996 | Ezoe . |

FOREIGN PATENT DOCUMENTS

| | | |
|---|---|---|
| 0 087 847 A1 | 9/1983 | European Pat. Off. |
| 0 375 831 A1 | 4/1990 | European Pat. Off. |
| 0 587-078 | 4/1993 | European Pat. Off. |
| 0 587 078 A1 | 3/1994 | European Pat. Off. |
| 42 36 717 | 1/1994 | Germany . |
| 6-16857 | 4/1994 | Japan . |
| WO 91/02023 | 2/1991 | WIPO . |
| WO 94/28567 | 4/1992 | WIPO . |
| WO 92/08759 | 5/1992 | WIPO . |
| WO 92/14782 | 9/1992 | WIPO . |
| WO 92/18325 | 10/1992 | WIPO . |
| WO 94/18567 | 10/1992 | WIPO . |
| WO 94/17137 | 1/1994 | WIPO . |
| WO 94/17132 | 8/1994 | WIPO . |

OTHER PUBLICATIONS

Derwent Abract No. An 76–55374X.
European Search Report for European Application No. 95/073393.1.
Chemical Abstracts, vol. 121, No. 2, Abstract No. 11385x, 1994.

*Primary Examiner*—John M. Cooney, Jr.
*Attorney, Agent, or Firm*—Bryan Cave LLP

[57] ABSTRACT

Biodegradable foamed plastic material having a bulk density comprised within the range of from 5 to 13 kg/m$^3$, comprising:

- 30–99.5 by weight of polisaccharide containing more than 50% of thermoplastic starch or starch complexed by polimeric structures, having an intrinsic viscosity (in DMSO) lower than 1.3 dl/g and less than 20% by weight of soluble fraction in ethanol;
- 0.5–70% by weight of a thermoplastic polymer which is soluble in starch, or is capable of complexing it;
- 0–20% by weight of water.

The material can be used as a loose filler or for other foamed articles.

14 Claims, 1 Drawing Sheet

BIODEGRADABLE FOAMED PLASTIC MATERIALS

The present invention relates to biodegradable, foamed plastic materials and to the process for preparing them.

In the sector of foamed materials, used in particular, for protective packages, the need is more and more felt for replacing foamed polystyrene with materials meeting the biodegradability requirement.

Thanks to their biodegradability and antistatic properties, starch-based materials can represent a valuable alternative.

Unfortunately, the use properties of these products are not yet comparable to those of polystyrene in terms of costs, brittleness, trend to release dust, too high density values.

European patent application EP-A-087 847 discloses a process for preparing foamed, starch-based articles by heating starch or starch containing materials in an extruder in the presence of 10–30% by weight of water and a foaming agent, and subsequent extrusion.

European patent application EP-A-375 831 discloses foamed articles formed of high-amylose starch, displaying good mechanical characteristics and a closed-cell structure.

These foamed articles are prepared by extrusion in the presence of water at temperatures comprised within the range of from 150° to 250° C., optionally followed by a thermoforming treatment. High costs and brittleness under low humidity conditions are the drawbacks of this product.

Published international application WO 91/02023 discloses foamed articles of biodegradable plastic material prepared by extruding a composition which contains starch and a synthetic polymer selected from ethylene/vinyl alcohol and ethylene/acrylic acid, copolymers also in the presence of a polymeric acid and sodium bicarbonate as foaming agent. In this case, the products display an extremely high resilience and low density values, however their high cost renders them not competitive as loose-fillers.

International patent application WO92/18325 claims water disperdible foamed materials manufactured by starting from cereal and legume meals with low contents of amylose, submitted to partial dextrinization by intense mechanical working and/or presence of acids. Also the addition of polymeric agents, such as polyvinyl alcohol, is provided in a second step of the production process, in order to prevent the materials from undergoing degradation.

Although it is cheap, this product results to be brittle immediately after extrusion and must be wetted in order to increase its toughness. The bulk density reached in the case of "C"-shaped bodies is comprised within the range of from 8 to 15 Kg/m$^3$.

International patent application 92/08759 relates to starch also containing up to 50% of cellulosic residues and small levels of natural rubber. The products according to that invention have bulk density values comprised within the range of from 11 to 36 Kg/m$^3$, and are obtained by direct extrusion on an extruder with an L:D ratio of approximately 2.5; heat is supplied by friction.

U.S. Pat. No. 5,185,382 relate to loose fillers which contain starch and polyethylene glycol obtained via direct extrusion, with bulk density values comprised within the range of from 10.8 to 36 Kg/m$^3$.

It has now unexpectedly been found that a starch-based biodegradable foamed plastic material can be prepared which can be used as loose fillers and generally as a packaging material, in form of sheet or small-sized bondable particles or of injected foamed material, endowed with good toughness characteristics also under low moisture conditions, and with low values of bulk density. Thanks to its low bulk density values, comprised within the range of from about 13 to 5 Kg/m$^3$, corresponding to a specific density lower than 32 kg/m$^3$, the material results to be of low cost.

SUMMARY OF THE INVENTION

The foamed material according to the present invention comprises, as essential components:

from 30 to 99.5%, and preferably from 60 to 95% by weight of a polysaccharide containing an amount higher than 50%, of a thermoplastic starch which is plasticized or complexed by natural or synthetic polymeric structures, wherein said starch has:

an intrinsic viscosity in (dimethylsulphoxide) DMSO lower than 1.3 dl/g;

an ethanol soluble fraction at 25° C. lower than 20% by weight, preferably lower than 10% and still more preferably lower than 5%;

from 0.5 to 70%, preferably from 5 to 40% by weight, of one or more thermoplastic polymers, wherein at least 10% of this fraction is constituted by a thermoplastic polymer (A) which is soluble in starch, or (B) is capable of complexing starch; and from 0 to 20%, preferably from 5 to 17% by weight of water.

BRIEF DESCRIPTION OF THE DRAWING

The relationship existing between bulk density (weight of a defined volume of loose fillers) and specific density (pycnometric density as measured by using small glass spheres) is shown in FIG. 1. As already stated, the specific density is lower than 32 kg/m$^3$ and can reach as low values as 18.5 kg/m$^3$, or even lower.

DETAILED DESCRIPTION OF THE INVENTION

Figure 1:
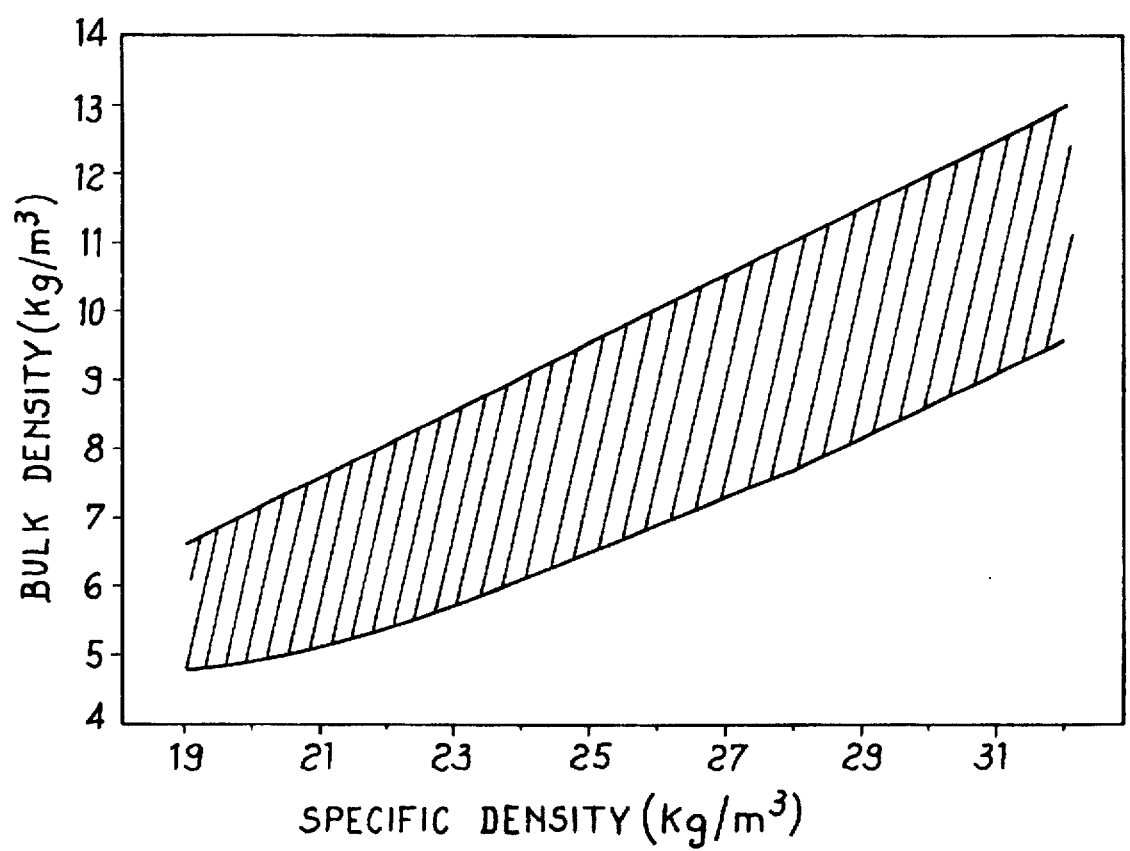

The foamed materials according to the present invention have closed-cell structure.

The presence of one or more thermoplastic polymers which are soluble in starch, or are capable of complexing the starch in the composition of the foamed materials, allows to obtain a homogeneous, high melt strength molten mass and therefrom foamed articles which show good resilience and low moisture sensitivity.

The loose fillers useable in packaging industry can be given any shapes, including alphabetical characters, star shapes, cylindrical shapes and others.

The thermoplastic starch useable for preparing the foamed material according to the present invention can be a native starch, preferably maize, potato, tapioca, rice, wheat, pea starch, and also high-amylose starch, preferably containing more than 30% by weight of amylose, and waxy starches.

Furthermore, physically and chemically modified starch grades can be in part used, such as ethoxylated starches, oxypropylated starches, starch acetates, starch butyrate, starch propionates, with a substitution degree comprised within the range of from 0.1 to 2, cationic starches, oxidized starches, crosslinked starches, gelled starches, starches complexes by polymeric structures, characterized by a band at 947 cm$^{-1}$ when analyzed by second-derivative FTIR (Fourier Transform Infra Red analysis). The starchy material is converted into the thermoplastic state by tretment in heated extruders or any devices capable of securing temperature and shear conditions capable to cause the material to become thermoplastic, operating in the presence of water and/or a plasticizer at temperature from 80° C. to 210° C.

The term "polysaccharide" as used herein, is meant to encompass not only refined starch, but also grains containing both starch and cellulosic products.

Independently on the starting starch used, the foamed material is characterized by a starch component having an intrinsic viscosity in DMSO lower than 1.3 dl/g and preferably comprised within the range of from 1.1 to 0.5 dl/g. Such a decrease in viscosity has however to take place without generating a high content of ethanol soluble sugars.

The absence of large amounts of low molecular weight fractions is responsible for the higher toughness of the foamed material already immediately after their extrusion.

The thermoplastic polymers useable as components of foamed particles are selected from:

i. polymers of natural origin, which may be either modified or non-modified, in particular, cellulose derivatives, as cellulose acetate, cellulose propionate, cellulose butyrate and their copolymers, having a substitution degree comprised within the range of from 1 to 2.5, optionally plasticized with caprolactone, low molecular weight polycaprolactone, or mono-, di- and tri-acetine, phthalate, in particular dimethyl phthalate, propane diol, polymers such as alkyl-cellulose hydroxyalkylcellulose, carboxyalkylcellulose, in particular, carboxyl methyl cellulose, nitrocellulose and, in particular, carboxyl methyl cellulose, nitrocellulose, and, furthermore, chitosan, pullulan or casein and caseinate, gluten, zein, soy bean proteins, alginic acid and alginate, natural rubbers, polyaspartates.

ii. biodegradable polymers of synthetic origin or from fermentation, in particular polyesters, such as homopolymers or copolymers of aliphatic $C_2$–$C_{24}$ hydroxy acids, or of their corresponding lactone or lactides, and furthermore polyesters derived from difunctional acids and aliphatic diols, e.g.:

poly (epsilon-caprolactone), its grafted or block copolymers, the reaction products of caprolactone oligomers or polymers with aromatic or aliphatic isocyanates, polyureas, copolymers with lactic acid, glycolic acid, with polyhydroxy butyrates and polyhydroxy butyrate-valerate;

polymers of lactic acid or of lactide, polymers of glycolic acid or of polyglycolide, copolymers of lactic acid or glycolic acid;

polyhydroxy butyrate or polyhydroxy butyrate-valerate and copolymers with other polyester;

polyalkylene succinates, and, in particular, polyethylene and/or polybutilene succinate, polyalkylene sebacate, polyalkylene azelate, polyethylene or polybutylene brassilate and their copolymers, optionally copolymerized with aliphatic or aromatic isocyanates, with their molecular weight which can be increased by means of chain extenders;

iii. polymers capable of interacting with starch forming complexes, i.e. polymers which contain hydrophillic group intercalated to hydrophobic sequences, identified as (B) polymers, as:

ethylene: vinyl alcohol copolymers containing up to 50% by weight, preferably 10–44% by weight, of ethylene units, oxidized ethylene/vinyl alcohol copolymers, or ethylene/vinyl alcohol copolymers terminated with fatty acids, or grafted with polycaprolactone, or modified with acrylic or methacrylic monomers and/or pyridinium;

ethylene: vinyl acetate copolymers, also partially hydrolysed:

ethylene: acrylic esters copolymers;

ethylene: acrylic esters: maleic anhydride or ethylene:vinyl acetate:glycidyl methacrylate terpolymers;

ethylene copolymers with unsaturate acids such as acrylic acid, methacrylic acid, crotonic acid, itaconic acid, maleic anhydride, in particular ethylene: acrylic acid copolymers containing 5–50% by mole, of units deriving from acrylic acid;

ethylene : vinyl aretate terpolimers totally or partially hydrolysed with acrylic acid or methacrylic acid or crotonic acid or itaconic acid;

aliphatic 6-6, 6-9 or 12 polyamides, aliphatic polyurethanes, random or block copolymers polyurethane/polyamide, polyurethane/polyether, polyurethane/polyester, polyamide/polyester, polyamide/polyether, polyester/polyether, polyurea/polyester, polyurea/polyether;

polycaprolactone-urethane in which the size of polycaprolactone block is comprised within the range of from 300 to 3000 as molecular weight, and in which used isocynates are MDI (methylene-diphenyl-diisocyanate), toluene diisocyanate, hexamethylene diisocynate), toluene diisocyanate, hexamethylene diisocyanate, isophorone diisocyanate;

epoxy resins such as polyalkylene oxide/ester polymers ended with glycidil groups.

iv. soluble polymers, and anyway capable of forming hydrogen bonds with starch, identified as (A) polymers, in particular polyvinyl alcohol with various hydrolysis degrees, possibly modified with acrylate or methacrylates, polyvinyl alcohol previously plasticized or modifiedified in order to decrease the melting point thereof, possibly containing geleting agents such as boric acid, borates or phosphates, copolymers of vinyl acetate in various hydrolysis degrees with vinyl pyrrolidone or styrene, polyethyl oxazolines, polyvinyl pyridine. Preferred thermoplastic polymers are polyvinyl alcohol, copolymers of an olefinic monomer, preferably ethylene, with a monomer selected from vinyl alcohol, vinyl acetate, acrylic acid and methacrylic acid, aliphatic polyesters, such as polycaprolactone, polybutene succinate and their copolymers, aliphatic polyamides and polyester-urethanes.

The foamed materials according to the present invention preferably contain a nucleating agent.

The amount of such a nucleating agent in the foamed material is comprised within the range of from 0.005 to 5% by weight, preferably of from 0.05 to 3% by weight, still more preferably of from 0.2 to 2% by weight.

Useable nucleating agents are, e.g., inorganic compounds such as talc (magnesium silicate), calcium carbonate, possibly with their surface being treated with adhesion promoters such as silanes, and titanates. Furthermore, organic fillers can be used such as shells of yeats coming from sugar beet processing, dried, ground and powdered sugar beet flesh, wood dust, cellulose powder and fibrils.

The nucleating agent can be added to the blend used to prepare the foamable pellets or, according to an alternative route, it can be added to the foamable pellets in master-batch form. In that case, said master-batch can contain amounts comprised within the range of from 10 to 50% by weight, of one or more fillers.

The foamable particles or the formulation to be foamed may furthermore contain one or more lubricant and/or dispersing agents having a hydrophillic/lypophilic balance index (HLB) comprised within the range of from 3 to 25, preferably of from 6 to 20. When they are used, these agents can be present in amounts comprised within the range of from 0.01 to 5% by weight, preferably of from 0.1 to 3% by weight.

The foamable pellets, or the formulation to be foamed, can also contain one or more plasticizer agents. When they are used, said plasticizer agents are present in amount comprised within the range of from 0.5 to 20% by weight, preferably of from 0.5 to 5.0% by weight.

Useable plasticizer agents are, for instance, those disclosed in published international patent application WO92/14782, the content of which is understood as being incorporated to the present disclosure by reference. Glycerol, sorbitol, mannitol, erythritol, low molecular weight polyvinyl alcohol, besides the oxy-ethylated or oxy-propylated derivatives of said compounds, and furthermore urea, are particularly suitable.

The compositions can also contain compounds of polyvalent elements belonging to the III and IV Groups of the Periodic Table, preferably belonging to the III Group, and preferably in the presence of oxygen.

Such compounds include: boric acid, boric anhydride, sodium metaborate, both anhydrous and hydrated sodium borate, alumina hydrated alumina, aluminium carbonate, aluminum acetate and still other carboxylates, aluminum borate, aluminum phosphate, sodium-aluminum phosphate, silic acid, alkali and alkaline-earth metal aluminates, as sodium silicate and magnesium-ailicate.

Furthermore, the foamable pellets or the formulation to be foamed may contain one or more flame retardants, which can be added to the blend used to prepare the foamed particles or, according to an alternative route, can be added to the foamed particles in a master-batch form, in particular in combination with the nucleating agent.

When they are used, these flame retardants are present in amounts comprised within the range of from 0.1 to 20% by weight, preferably of from 1 to 10% by weight, still more preferably of from 2 to 5% by weight.

Useable flame retardants can be selected from those derived from phosphorus, sulfur or halogen containing products, or combinations thereof. For exemplifying purposes, triphenyl phosphate, tributyl phosphate, tricresyl phosphate, tributoxyphenyl phosphate, melamine pyrophosphate, ammonium polyphosphate, ethylene diamine, ammonium polyphosphate, guanidium phosphate, tetrabromophtalic anhydride, halogenated paraffins, diphenyl oxide with different bromination degrees, ammonium sulfate, ammonium sulfamate, are suitable for the intended purpose. Particularly advantageous are ammonium sulfate, ammonium sulfamate, ammonium polyphosphate, guanidium phosphate and melamine pyrophosphate.

Still other flame retardants which can be used are aluminium hydroxide, antimony oxide, ammonium perborate, ammonium octamolybdate.

In the case of particular applications, the presence of substances displaying rodent repellant activity can be required in the foamable formulations. These substances can be added to the blend used to prepare the foamed materials, or they can be added to the foamed materials as microcapsules containing the active principle, or as a master-batch, in particular in combination with the nucleating agents and/or flame retardants.

For that purpose, such substances as N, N-diethyl-m-toluamide, diethyl phenyl acetamide, 2-decenal, ammonium chloride, potassium chlorate, terpenoids, cycloheximide, diguanidinoazaeptadecane, can be used. Terpenoids and, in particular, menthol and limonene, are preferred.

When they are used, these rodent repellents are present in amounts comprised within the range of from 0.1 to 5% by weight, preferably comprised within the range of from 1 to 3% by weight.

The foamed material according to the present invention can be prepared by means of a two-step process, the first step of which consists of the direct extrusion of the starch-based composition, carried out by means of a single-screw or twin screw extruder, by operating at a temperature comprised within the range of from 150° to 200° C.

In this first step, the non-dried starch is extruded in the presence of an added water amount comprised within the range of from 5 to 20% by weight.

The extrusion causes starch to get thermo-plasticized and/or complexed owing to the joint effect of water, temperature, presence of specific thermoplastic polymers of (A) and/or (B) types. The total water content at the nozzle is comprised within the range of from 5 to 20% by weight, and the intrinsic viscosity of starch in DMSO is comprised within the range of from 1.5 to 8 dl/g in those cases in which starch is constituted by less than 50% of amylose. The total water content in the pellets is between 5 and 20% by weight.

The second step consists in foaming foamable pellets containing starch with an intrinsic viscosity in DMSO comprised within the range of from 2 to 8 dl/g, using a single screw extruder with a whatever ratio of screw length/screw diameter, equipped with a screw capable of yielding a specific energy higher than:

$$0.1 \text{ kWh/kg} - \frac{T-200}{5} \times 0.01 \qquad (1)$$

for residence times of the molten material longer than $$\frac{140 \cdot L/D}{30}$$

seconds where L/D is the length/diameter ratio of the screw and for temperatures (T) at the head of the extruder comprised within the range of from room temperature to 240° C.

If such conditions are verified, then a low-specific-density material, having a lower specific density than 32 kg/m$^3$ and a lower intrinsic viscosity than 1.3 dl/g is also obtained for residence times inside the extruder chamber comprised within the range of from 20 to 60 seconds.

A foaming equipment capable of developing the energy defined by equation (1) allows to obtain foamed materials having density lower than 32 kg/m$^3$ even felding granules prepared under pasting conditions i.e. under temperature conditions in the first step lower than 150° C. and using grater amounts of water (from 12 to 30 w% of added water). Operating under the above pasting conditions the swelling of starch granules is obtained (gelling) without, however, distraing the starch structure. The water concentration is kept to the values optimal for the foaming with a final drying step.

The granules can also be prepared by aggregating starch and the other components just by effect of pressure, without using heat.

Method for Determining Solubility in Alcohol

An amount of 1 gram of foamed product is dispersed in 30 ml of an aqueous solution containing 80% ethanol. After a 15 minutes stirring by means of a mechanical stirrer, the suspension is centrifuged at 180 revolutions per minute, for 10 minutes. The supernatant is decanted off, then is extracted once again. Sugars contained in supernatant are determined by means of anthrone method.

Method for Determining Intrinsic Viscosity in DMSO

A volume of 10 ml of dimethyl sulfoxide (DMSO) is charged to the tank of a BISHOP viscometer, the so prepared instrument is then transferred to a thermostatic bath preset at 30° C., and approximately 30 minutes later, recording the pure solvent flow times is started. About 50 mg of sample is then weighed and is added to the cup of the viscometer; 10 ml of DMSO is added, the tank is closed with the suitable ground stopper and the whole preparation is kept stirred for 1 hour at 70°–80° C. When dissolution is complete, the cup is applied to the viscometer, and the instrument is transferred to a thermostatic bath at 30° C. The flow times of the solution are recorded performing a plurality of readings and calculating the average flow time.

Through the purposely provided tube, the solution contained within the tank of the instrument is diluted with 10 ml of pure DMSO; the resulting diluted solution is allowed to reach temperature equilibrium and the flow times are recorded.

A further dilution is then carried out with a further volume of 10 ml of DMSO, and the whole process is repeated.

To compute the intrinsic viscosity, the concentration (c) values are reported on a chart versus the ratio of specific viscosity: concentration ($\eta$ sp/c) and the resulting line is extrapolated to (C=O) to obtain the value of [$\eta$] (intrinsic viscosity).

$$\eta \; sp/c = \frac{\eta \; rel}{c}$$

wherein $$\eta \; rel = \frac{t \; solut.}{t \; solv.} - 1$$

c=concentration, expressed as polymer g per 100 ml of solution.

t solut.=average flow time of solution, as seconds.

t solv.=average flow time of pure solvent, as seconds.

| | Definitions |
|---|---|
| Specific density (kg/m$^3$) | pycnometric density of the individual foamed bodies |
| Bulk density (kg/m$^3$) | density value calculated from the weight of that amount of foamed elements which is necessary to fill a volume of 16 liters. |

EXAMPLE 1

75 w.pts of potato starch, 9 w.pts of 87%-hydrolized polyvinyl alcohol having a molecular weight of 70000, 15 w pts of water and 0.1 w.pts of glycerol momooleate are fed to a twin-screw extruder of 60 mm of diameter, L/D=36.

The screw, which was constituted by an 8 diameter long zone of mixing elements, had a venting zone between diameters 29 and 32.

The head, which contained 24 bores of 3 mm of diameter, was thermostated at 120° C. The temperature profile used for the nine heating zones was the following: 90°-110°-175°-175°-175°-175°-130°-120°-120° C.

The revolution speed of the screw was of 120 rpm and the throughput was of the order of 40 kg/h.

A material resulted with intrinsic viscosity in DMSO of 3.1 dl/g and a water content of 15.7%.

EXAMPLES 2-5

The pellets obtained by operating according to as disclosed in Example 1 were fed to a single screw Ghioldi extruder of 40 mm of diameter with L:D=30, forced feed on a 4-zone thermostatting (cooling by fans) equipped with a 20 mm long nozzle of 2 mm of diameter, equivalent to a ratio of L:D=10.

Two screw types were used for the several examples:
compression ratio 1:3 with constant profile;
compression ratio 1:3 with metering profile.

Before foaming, the foamable pellets were added with 0.5% of talc (average particle size=1.3 μm).

The results are reported in Table 1.

From the obtained data, it clearly appears that in the case of the screw with constant compression ratio (examples 2C–5C), capable of applying a specific energy not higher than 0.1 kWh/kg for a residence time of the molten material in the chamber of about 140 seconds, which does not comply with the conditions of formula (1), the density of foamed material for residence times inside the extruder chamber comprised within the range of from 40 to 66 seconds, increases with increasing screw revolution speed and is always higher than 32 kg/m$^3$. Surprisingly, in the case of the metering screw (Examples 2–5), which already at a residence time inside the extruder chamber of 140 seconds applies a specific power higher than 0.1 kWh/kg, very low density values are obtained which tend to remain constant with varying throughput rates.

The products obtained with the metering screw are very resilient soon after foaming.

In Example 3, the soluble portion in an aqueous solution of ethanol at 80% is of 5%.

EXAMPLES 6-8

The used foaming conditions are similar to those as of Example 3C, with temperature being varied according to as reported in Table 2. One will observe that the increase in temperature causes a progressive decrease in bulk density, until lower values than 32 kg/m$^3$ are reached by starting from temperatures of the molten material of 215° C. The values of specific energy at residence times within the extruder chamber of 140 seconds by starting from 215° C. result in fact to be higher than, or equal to, those as provided for by equation (1).

EXAMPLES 9-11

The same conditions as of Example 5 were adopted, but with a different temperature profile, which was according to as reported in Table 2.

A progressive decrease in density can be clearly seen, which density remains always lower than 32 kg/m$^3$. The specific energy at 140 seconds results to be always higher than the values given by formula (1).

EXAMPLES 12-13

The same conditions as of Example 3C-4C are repeated, however with the chamber volume being increased. The results are reported in Table 3.

In particular, a slight decrease in density can be observed, which is anyway insufficient to reach lower density values than 32 kg/m$^3$ within the examined residence time range.

EXAMPLES 14-18

The conditions for these Examples are reported in Table 3, and concern the change in extruder chamber volume, with all other conditions, relatively to Examples 3–5, being the same. One will observe that in this case, the increase in the residence times has a very meaningful effect on the decrease in density which, in some cases, approximates 21 kg/m$^3$.

The corresponding bulk density reaches values of 6.5 kg/m$^3$. All density data from the above examples correlate, in this system, with the intrinsic Viscosity values displayed by the same materials, as measured in DMSO.

EXAMPLE 19

The same composition as in Example 1, in which potato starch is replaced by a high-amylose starch, Eurylon VII, was processed according to the same conditions as in Example 1, and was then foamed according to the conditions as in Example 5, apart form the shape of the nozzle which, rather being circular, was "S"-shaped, with a surface area of 6.2 mm$^2$.

Starch intrinsic viscosity, foamed material specific density and bulk density were found to be of 0.67 dl/g, 18.8 kg/m$^3$, and 5 kg/m$^3$, respectively.

EXAMPLE 20

A composition is taken into consideration which is only different from the composition of Example 1, for the replacement of polyvinyl alcohol with polycaprolactone-urethane Estane 54351, containing polycaprolactone units with a molecular weight of 530 and urethane units deriving from methylene diphenyl diisocyanate.

Under the same conditions as of Example 5, a foamed product was obtained which contains starch having an intrinsic viscosity in DMSO of 1 dl/g, and has a specific density of 25 kg/m$^3$ and a bulk density of 7 kg/m$^3$.

EXAMPLE 21

84.5 w.pts of wheat starch, 14 w.pts of polyvinylalcohol 0.4 w.pts of glycerol-monostereate, 1.6 w.pts of water 0.5 w.pts of talc were mixed in a slow mixer and fed to a pelletizer formed of grooved rotors pressing the mixture against a holed ring. The dimension of the pellets is regulated by a knife rotating around the ring.

The temperature increase during the extrusion was of 60° C.–80° C. due to friction.

The obtained pellets were foamed according to example 5.

The specific density was 25.9 kg/m$^3$ and the intrinsic viscosity 1.29 dl/g.

TABLE 1

Examples 2–5

| Example Nos. | Screw | Specific energy at a residence time in the extruder chamber of 140 seconds (kWh/kg) | Screw revolution speed, rpm | Feed flow rate (kg/h) | Melt (°C.) | Residence time inside extruder chamber (seconds) | Specific density (kg/m$^3$) | Intrinsic Viscosity η (in DMSO) (dl/g) |
|---|---|---|---|---|---|---|---|---|
| 2 C+ | C.T. CR 1:3 | 0.085 | 90 | 46.9 | 195 | 66 | 33.6 | 1.4 |
| 3 C+ | | 0.085 | 110 | 57.5 | 195 | 53 | 37.3 | |
| 4 C+ | | 0.085 | 130 | 69.7 | 199 | 44 | 38.4 | |
| 5 C+ | | 0.085 | 150 | 79.4 | 200 | 39 | 40 | 1.56 |
| 2 | METERING CR 1:3 | 0.12 | 90 | 34.1 | 200 | 77 | 25.6 | 1.1 |
| 3 | | 0.12 | 110 | 41.1 | 197 | 64 | 25.7 | 1.28 |
| 4 | | 0.12 | 130 | 48.9 | 197 | 53 | 25.1 | |
| 5 | | 0.12 | 150 | 56.8 | 202 | 46 | 24.9 | 1.31 |

C* = Comparison Example
CR = Compression ratio

TABLE 2

Examples 6–11

| Example Nos. | Screw | Specific energy at a residence time in the extruder chamber of 140 seconds (kWh/kg) | Screw revolution speed, rpm | Feed flow rate (kg/h) | Melt (°C.) | Residence time inside extruder chamber (seconds) | Specific density (kg/m$^3$) | Intrinsic Viscosity η (in DMSO) (dl/g) |
|---|---|---|---|---|---|---|---|---|
| 3 C+ | C.T. CR 1:3 | 0.085 | 110 | 57.5 | 195 | 53 | 37.3 | |
| 6 C+ | | — | 110 | 58.5 | 210 | 53 | 34 | |
| 6 | | 0.068 | 110 | 58.7 | 215 | 52 | 32 | |
| 7 | | — | 110 | 58.6 | 220 | 52 | 29.8 | |
| 8 | | 0.057 | 110 | 58.6 | 225 | 52 | 26.9 | |
| 5 | METERING CR 1:3 | 0.12 | 150 | 56.8 | 198 | 46 | 24.9 | 1.31 |
| 9 | | 0.1 | 150 | 58 | 210 | 45 | 25 | |
| 10 | | 0.09 | 150 | 60 | 215 | 44 | 24 | |
| 11 | | — | 150 | 60.5 | 225 | 43 | 24 | |

C* = Comparison Example
CR = Compression ratio

TABLE 3

Examples 12-18

| Example Nos. | Screw | Extruder volume (cm³) | Screw revolution speed, rpm | Feed flow rate (kg/h) | Melt (°C.) | Residence time inside extruder chamber (seconds) | Specific density (kg/m³) | Intrinsic Viscosity η (in DMSO) (dl/g) |
|---|---|---|---|---|---|---|---|---|
| 3 C+ | C.T. CR 1:3 | 610.8 | 110 | 57.5 | 195 | 53 | 37.3 | |
| 4 C+ | | 610.8 | 130 | 69.7 | 199 | 44 | 38.4 | |
| 12 | C.T. CR 1:3 | 802.5 | 110 | 57.1 | 208 | 71 | 35.4 | |
| 13 | | 802.5 | 130 | 67.9 | 209 | 59 | 34.3 | 1.45 |
| 3 | METERING CR 1:3 | 518.6 | 110 | 41.1 | 197 | 64 | 25.7 | 1.28 |
| 4 | | 518.6 | 130 | 48.9 | 197 | 53 | 25.1 | |
| 5 | | 518.6 | 150 | 56.8 | 202 | 46 | 24.9 | 1.31 |
| 14 | METERING CR 1:3 | 722.5 | 110 | 42 | 199 | 87 | 21.6 | 0.91 |
| 15 | | 722.5 | 130 | 50 | 196 | 73 | 21.5 | |
| 16 | | 722.5 | 150 | 57.5 | 198 | 63 | 22.3 | 0.94 |
| 17 | METERING CR 1:3 | 790.5 | 110 | 43.5 | 210 | 91 | 21.6 | |
| 18 | | 790.5 | 150 | 59.5 | 211 | 67 | 21.2 | 0.85 |

C* = Comparison Example
CR = Compression ratio

We claim:

1. Biodegradable foamed plastic material having a bulk density value comprised within the range of from 5 to 13 kg/m³, and a corresponding specific density equal or lower than 32 kg/m³, comprising:

from 30 to 99.5% by weight of a polysaccharide containing a level higher than 50%, of thermoplastic starch or starch complexed with natural or synthetic polymeric structures, wherein said starch has:
an intrinsic viscosity lower than 1.3 dl/g;
an ethanol soluble fraction at 25° C. lower than 20% by weight;

from 0.5 to 70% by weight of one or more thermoplastic polymers, wherein at least 10% of this fraction is constituted by a thermoplastic polymer (A) which is soluble in starch, or (B) is capable of complexing starch; and from 0 to 20% by weight of water.

2. Foamed material according to claim 1 in which starch has an intrinsic viscosity comprised within the range of from 1.1 to 0.5 dl/g and a content of ethanol soluble fraction lower than 20% by weight.

3. Foamed material according to claim 2, wherein the ethanol soluble fraction is lower than 10% by weight.

4. Foamed material according to claim 1, in the form of sheet or sinterable particles or injection moulded articles, or as foamed loos fillers useable for packaging.

5. Foamed material according to claim 1, in which the thermoplastic polymer is selected from modified or unmodified natural polymers.

6. Foamed material according to claim 5 wherein the natural polymer is a cellulose derivative with a substituition degree comprised within the range of from 1 to 2.5.

7. Foamed material according to claim 1, in which the thermoplastic polymer is selected from homopolymers and copolymers of aliphatic $C_2$-$C_{24}$ hydroxy acids, their corresponding lactones and lactides and aliphatic polyesters deriving from bicarboxylic acids and aliphatic diols.

8. Foamed material according to claim 1, in which the (A) thermoplastic polymer is selected from the group consisting of polyvinyl alcohol, polyvinyl alcohol modified with acrylates or methacrylates, polyvinyl alcohol previously plasticized or modified in order to lower its melting point, copolymers of vinyl acetate with vinyl pyrrolidone or styrene, polyethyloxazolines or polyvinyl pyridine.

9. Foamed material according to claim 1 in which the (B) thermoplastic polymer is selected from copolymers of ethylene with vinyl alcohol or vinyl acetate or unsaturated acids, aliphatic 6-6, 6-9 or 12 polyamides, aliphatic polyurethanes, polyurethane-polyamide, polyurethane-polyether, polyurethane-polyester copolymers.

10. Foamed material according to claim 5, in which the thermoplastic polymer is contained in an amount comprised within the range of from 2 to 35% by weight.

11. Foamed material according to claim 1 in which the complexed thermoplastic starch is obtained from native starch, comprising maize, potato, tapioca, rice, wheat or pea starch, and starch with a amylose content higher than 30% by weight.

12. Foamed material according to claim 1, in which the synthetic polymer is selected from polyvinyl alcohol, ethylene copolymers with a monomer selected from vinyl alcohol, vinyl acetate, acrylic acid and methacrylic acid, polycaprolactone, polybutylene succinate and copolymers thereof, aliphatic polyamides and polyesterurethanes.

13. Foamed material according to claim 1, containing an additive selected among the nucleating agents, the flame retardants and agents acting as a rodent repellant.

14. Process for preparing the foamed material according to claim 2, comprising the steps of (a) extruding, at a temperature comprised within the range of from about 150° to 200° C., a composition comprising from 30 to 99.5% by weight of a polysaccharide containing at least 50% of non-dried starch, from 0.5 to 70% of a thermoplastic polymer, of which at least 10% is constituted by (A) a polymer soluble in starch, or (B) a polymer capable of complexing starch; and from 0 to 20% by weight of water added to the water contained in the starch used as the starting material, until an intrinsic viscosity of starch is obtained, which is comprised within the range of from 1.5 ti 8 dl/g; and (b) foaming the foamable pellets deriving from the preceding step carried out on a single-screw extruder capable of supplying a specific energy higher than $$0.1 \text{ kWh/kg} - \frac{T-200}{5} \times 0.01$$

for residence times of the molten material longer than $$\frac{140 \cdot L/D}{30}$$

seconds where L/D is the length/diameter ratio of the screw and for temperatures at the head of the extruder comprised from room temperature head of the extruder to 240° C., the residence times during the foaming being comprised within the range 20 to 60 second at temperatures comprised within the range of from 180° to 240° C.

* * * * *